Patented Sept. 30, 1930

1,776,970

UNITED STATES PATENT OFFICE

WILFRID GIBSON, ANTHONY JAMES HAILWOOD, JOSEPH BARON PAYMAN, AND ARNOLD SHEPHERDSON, OF BLACKLEY, MANCHESTER, ENGLAND, ASSIGNORS TO IMPERIAL CHEMICAL INDUSTRIES LIMITED, OF LONDON, ENGLAND

NEW NAPHTHALENE DERIVATIVES AND THEIR APPLICATION IN DYE PREPARATIONS

No Drawing. Application filed August 1, 1928, Serial No. 296,859, and in Great Britain August 29, 1927.

A disadvantage commonly met with in aqueous pastes of more or less finely divided material is the tendency to coagulate and settle, so that the paste after being kept for a longer or shorter time is no longer uniform in composition. The addition of gums and other similar thickening material has been proposed, but these have their own special drawbacks such as liability to attack by fungi.

We have now discovered that polychlorinated naphthalenesulphonic acid and its salts have especially valuable properties in this connection. The addition of 2% of sodium polychloronaphthalenesulphonate (calculated on the total weight of paste) to an aqueous paste of duranthrene golden orange Y, for example, entirely prevents the settling out of the solid dystuff, and the paste is found to be practically uniform in composition after standing for a long period of time. This effect is due to the formation of a stiff gel, which however is easily stirrable and thins rapidly when stirred or shaken.

Solutions or pastes containing polychloronaphthalenesulphonic acid or its salts are not liable to deterioration by fungus growths. Our products have also valuable wetting-out properties.

As long ago as 1849 Laurent (Liebig's Annalen, 72, 300) recorded the fact that the potassium salt of sulphonated tetrachloronaphthalene, when precipitated by water from its alcoholic solution, forms a gel, but hitherto no technical application of this property has been made, and no other salts have been prepared.

The compounds we use are made by sulphonation of a polychloronaphthalene containing 3 to 4.5 atoms of chlorine in the molecule, such as may be obtained by various known methods, particularly by the process described in British application No. 291,849 filed, March 4, 1927 (British Dyestuffs Corp. Ltd., Payman and Gibson).

In the examples below we describe preferred methods of sulphonation and of applying products, but our invention is not limited to the details there given, either of the particular sulphonating agent used in Example 1 or of the exact proportions of the reagents in any of the examples. The parts are by weight.

*Example 1.—Preparation of polychloronaphthalenesulphonic acids.*—Polychloronaphthalenesulphonic acids may be prepared from the corresponding polychloronaphthalene. The latter compounds are conveniently prepared by the method described in British application No. 291,849, filed March 4, 1927, which method consists essentially in the direct chlorination of melted naphthalene at temperatures between 150° and 160° C.

300 parts of such a polychloronaphthalene, containing approximately 3.5 atoms of chlorine per molecule, are heated to 150° C. and 300 parts of 22% oleum are added during 10 minutes at 150–160° C. The temperature is then raised to 180° C. and after one hour at 180° C. the mixture is poured into 3000 parts of boiling saturated salt solution and allowed to cool, with stirring, for 18 hours. The precipitated sodium salt is filtered off, washed with brine, pressed and dried at 120° C. Unchanged polychloronaphthalene may be removed by extraction with hot benzene, and the residual sodium salt may be freed from sodium chloride by washing with 350 parts of boiling water.

The product so obtained gives a clear solution in hot water; a 1.6% solution on cooling sets to a gel, which, however, "liquefies" when stirred or shaken; dilute solutions froth readily and exhibit marked wetting-out properties.

Other salts may be made by neutralizing the sulphonation product with an appropriate base or salt.

*Example 2.*—To 100 parts of 12.5% paste of duranthrene golden orange Y, 25 parts of a hot aqueous 10% solution of sodium trichloronaphthalene sulphonate, obtained in the manner shown in Example 1, from polychloronaphthalene containing 3 atoms of chlorine per molecule, are added. The whole is well stirred and allowed to cool. The product is then ready for storage without risk of settling.

*Example 3.*—50 parts of a hot aqueous solution of sodium trichloronaphthalene sulphonate of 10% strength are mixed with 200 parts of an aqueous paste of thioindigo in a fine state of division, containing 25% of the pure dyestuff. The mixture is thoroughly agitated and then allowed to cool, after which it may be stored.

Example 4.—200 parts of an aqueous paste of the dyestuff obtained by coupling 1:2:4-dinitroaniline with β-naphthol, containing 25% pure dyestuff are mixed with 50 parts of a hot aqeuous 10% solution of sodium trichloronaphthalene sulphonate and the mass allowed to cool; whereupon a paste essentially free from the disadvantage of settling is obtained.

What we claim and desire to secure by Letters Patent is:—

1. The process of manufacturing alkali metal polychloronaphthalene sulphonates which comprises heating the corresponding polychloronophthalene with fuming sulphuric acid, diluting the reaction products with a concentrated alkali metal salt solution, cooling and filtering off the precipitated alkali metal salt of the polychloronaphthalene sulphonic acid.

2. The process of manufacturing alkali metal polychloronaphthalene sulphonates, which comprises heating a polychloronaphthalene, containing from 3 to 4.5 atoms of chlorine in the molecule, with fuming sulphuric acid, diluting the reaction products with a concentrated alkali metal salt solution, cooling and filtering off the precipitated alkali metal salt of the polychloronaphthalene sulphonic acid.

3. The process of manufacturing alkali metal polychloronaphthalene sulphonates which comprises heating the corresponding polychloronaphthalene with fuming sulphuric acid, diluting the reaction products with a concentrated alkali metal salt solution, cooling, filtering off the precipitated alkali metal salt of the polychloronaphthalene sulphonic acid and recovering the unchanged polychloronaphthalene by an extraction with benzene.

4. In the process of producing alkali metal poylchloronaphthalene sulphonates from polychloronaphthalene, the step which comprises the recovery of the unchanged polychloronaphthalene by an extraction of the mother liquor with benzene.

5. The process of manufacturing sodium polychloronaphthalene sulphonate, which comprises heating a polychloronaphthalene containing from 3 to 4.5 atoms of chlorin in the molecule with fuming sulphuric acid, diluting the reaction products with a concentrated solution of sodium chloride, cooling and filtering off the precipitated sodium salt of the polychloronaphthalene sulphonic acid.

6. A process of manufacturing an alkali metal polychloronaphthalene sulphonate, which consists in heating a polychloronaphthalene with about 22 per cent of fuming sulphuric acid at a temperature of about 150° C., raising the temperature and holding it at about 180° C. for approximately an hour, diluting the solution with a large volume of saturated alkali metal salt solution, cooling and filtering off the precipitated alkali metal salt of the polychloronaphthalene sulphonic acid.

7. As a new composition of matter a sodium polychloronaphthalene sulphonate, containing from 3 to 4.5 atoms of chlorin to the molecule, which is soluble in hot water producing a clear solution which, at concentrations above about 1 to 5 per cent, sets on cooling to a stirrable gel, and whose dilute solutions when acidified show marked wetting-out and frothing properties.

8. In the process of producing alkali metal polychloronaphthalene sulphonates from polychloronaphthalene, the step which consists in the addition of a large quantity of a concentrated alkali metal salt solution to a solution of polychloronaphthalene sulphonic acid, whereby the alkali metal salt of said acid is precipitated.

In testimony whereof we affix our signatures.

WILFRID GIBSON.
ANTHONY JAMES HAILWOOD.
JOSEPH BARON PAYMAN.
ARNOLD SHEPHERDSON.